(12) United States Patent
Nishizaki et al.

(10) Patent No.: US 6,580,714 B1
(45) Date of Patent: Jun. 17, 2003

(54) CONCENTRATOR TYPE ATM SWITCH FOR AN ATM SWITCHING SYSTEM

(75) Inventors: Hideki Nishizaki, Tokyo (JP); Motoo Nishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/184,513

(22) Filed: Nov. 2, 1998

(30) Foreign Application Priority Data

Nov. 4, 1997 (JP) .............................................. 9-302147

(51) Int. Cl.$^7$ .............................................. H04L 12/28
(52) U.S. Cl. ...................... 370/395.1; 370/434; 370/535
(58) Field of Search ............................ 370/434, 395.51, 370/433, 395.52, 395.53, 395.61, 395.64, 419, 411, 389, 393, 427, 534, 380, 369, 413, 370, 535, 372, 537, 375, 542, 387

(56) References Cited

U.S. PATENT DOCUMENTS

| | | | | |
|---|---|---|---|---|
| 5,394,396 A | * | 2/1995 | Yoshimura et al. | ......... 370/236 |
| 5,412,646 A | * | 5/1995 | Cyr et al. | .................... 370/411 |
| 5,414,415 A | * | 5/1995 | Ueda et al. | ............. 340/825.02 |
| 5,555,243 A | * | 9/1996 | Kakuma et al. | ............. 370/352 |
| 5,555,265 A | | 9/1996 | Kakuma et al. | |
| 5,612,951 A | * | 3/1997 | Yu et al. | ...................... 370/395 |
| 5,724,352 A | * | 3/1998 | Cloonan et al. | ............ 370/388 |
| 5,838,679 A | * | 11/1998 | Kim et al. | ............. 370/395.41 |
| 6,031,838 A | * | 2/2000 | Okabe et al. | ................ 370/395 |
| 6,496,513 B1 | * | 12/2002 | Takamichi | ................... 370/434 |

FOREIGN PATENT DOCUMENTS

| | | |
|---|---|---|
| CA | 2075027 | 11/1996 |
| EP | 0 549 122 A2 | 11/1992 |
| JP | Hei 2-82741 | 3/1990 |

OTHER PUBLICATIONS

English language translation of Japanese Office Action dated Feb. 22, Hei 11.
Canadian Office Action.

* cited by examiner

Primary Examiner—Seema S. Rao
Assistant Examiner—Alexander O. Boakye
(74) Attorney, Agent, or Firm—Whitham, Curtis & Christofferson, PC (57) ABSTRACT

An ATM switching system includes a plurality of (m) small-scale n×n ATM switch modules, and a coupling module for coupling the ATM switch modules to one another to implement a large-scale ATM switching system. The coupling module includes m concentrators corresponding to the m ATM switch modules. Each concentrator has a multiplexing block for multiplexing m×n signal sequences into n signal sequences, concentration buffer block including a n×n banyan network for specifying one of ATM switch modules for each effective cell based on a destination signal and a plurality of buffers. The concentrator operates at slow transfer rate in a large-scale ATM system so that the performance of the concentrator does not restrict the scale of the ATM system.

13 Claims, 6 Drawing Sheets

CONCENTRATOR TYPE ATM SWITCH FOR AN ATM SWITCHING SYSTEM

BACKGROUND OF THE INVENTION (a) Field of the Invention

The present invention relates to a concentrator type ATM switch for an ATM switching system and, more particularly, to a concentrator type ATM switch for use in an ATM switching system, which is capable of efficient transmission of information such as image, voice, and animation data.

(b) Description of the Related Art

Figure 1:
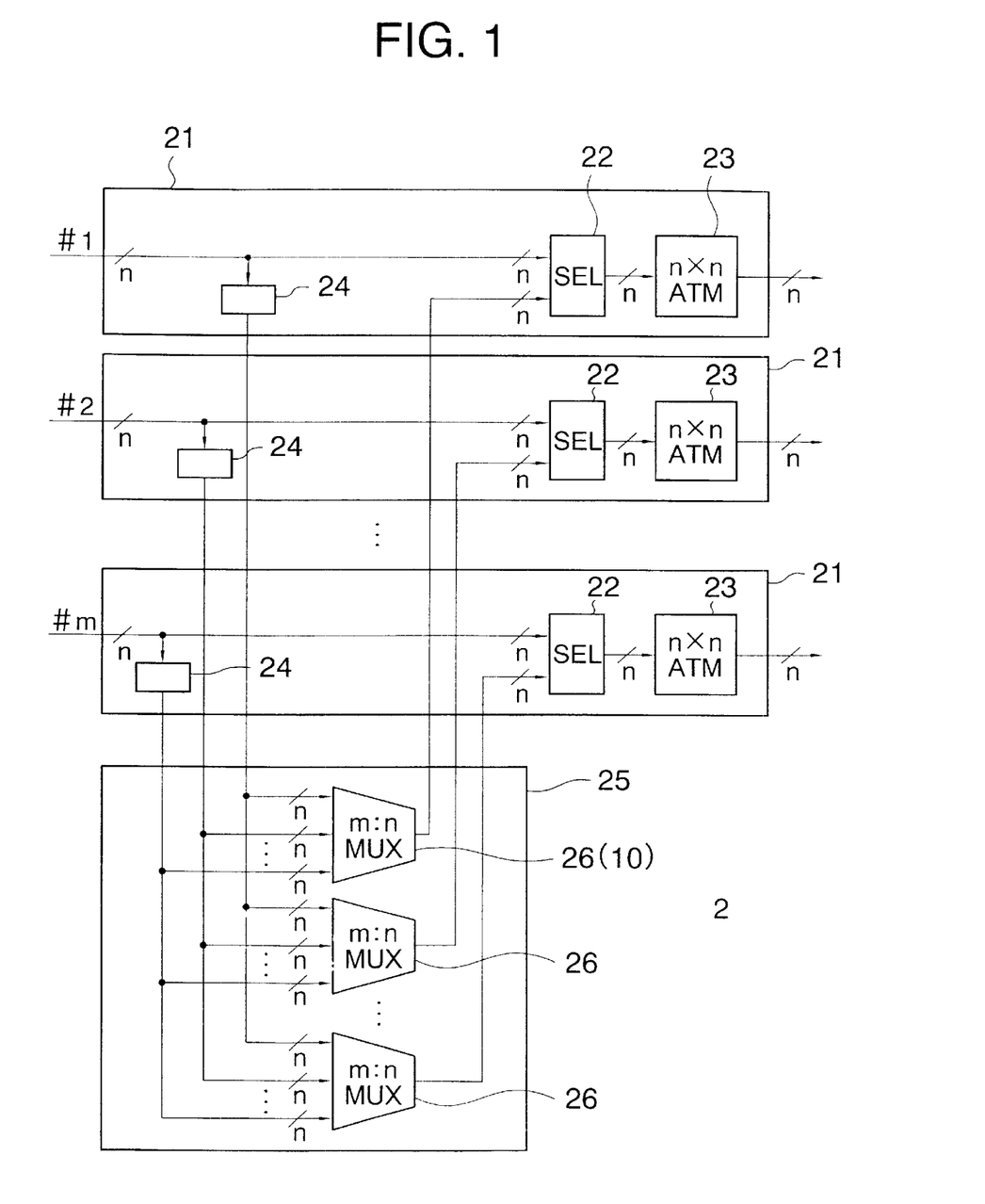
FIG. 1 is a block diagram of a typical ATM switching system.

An example of a typical ATM switching (network) system is shown in FIG. 1. This system includes a plurality of (m) comparatively small-scale n×n ATM switching modules 21 each including a n×n ATM switch 23, the ATM switching modules 21 being connected to one another through a coupling module 25 to form a large-scale ATM switching system. In this text, n×n switch as used herein means that the switch couples any one of n input ports to any one of n output ports, whereas n-to-1 selector and m-to-n multiplexer as used later mean that the selector selects any one of n inputs and the multiplexer multiplexes m signal sequences into n signal sequences.

In the ATM switching system of FIG. 1, a selector 22 is provided in each n×n ATM switch module 21 for selecting n cell data directly input therein or n cell data input through the coupling module 25 from another n×n ATM switch module 21. The n cell data selected by the selector 22 are supplied to the n×n ATM switch 23, which couples the same by switching to the output ports specified by the cell data.

The coupling module 25 receives m×n input data, or cell data supplied through m×n signal lines, which are supplied to the m ATM switch modules 21 and delivered from rout judgement blocks 24 in the ATM switch modules 21 after selecting the ATM switch modules 21 based on the destination of the data. A concentrator (or concentrator type ATM switch) 26 is provided in the coupling module 25 for each n×n ATM switch module 21. The concentrator 26 receives the m×n input data, supplied from one of the n×n ATM switch modules 21, to deliver the same to another of the n×n ATM switch modules 21 based on the destination of the data. That is, each concentrator 21 functions for multiplexing m×n signal sequences into n signal sequences.

The concentrator 26 may be of an output buffer type which stores all input data in output buffers after multiplexing the input data into a single signal sequence, of a knockout type which consecutively stores effective cell data in the output buffers from the first and discards the excess cell data if the number of effective cells to be processed at a time exceeds the number of the output ports, or of a switching type which functions for switching regardless of the order of the input cells and rearranges the order at the next stage of the switching.

The conventional concentrator 26 in the coupling module 25 as described above has a problem in that the transfer rate in the concentrator 26 rises along with the increase of the circuit scale that is increased by the number of ATM switch modules coupled by the coupling module 25. The increase in the transfer rate means that the upper limit of the physical performance of the concentrator 26 in the transfer rate restricts the scale of the ATM switching system obtained by the coupling.

Especially in the case of the knockout type concentrator, when the number of effective cells to be processed at a time exceeds the number of output ports provided therein, all the effective cells are not transmitted, resulting in a blocking switching operation of the system wherein excess effective cells are discarded.

SUMMARY OF THE INVENTION

It is therefore an object of the present invention to provide a concentrator type ATM switch, which is capable of suppressing the rise of the transfer rate therein and operating for a non-blocking switching wherein effective cells are not discarded.

It is another object of the present invention to provide an ATM switching system having the concentrator type ATM switch as described above.

The present invention provides, in one aspect thereof, a concentrator type ATM switch comprising a multiplexing block for receiving a plurality of (m) signal groups each including a plurality of (n) input signal sequences, the multiplexing block outputting n multiplexed signal sequences, a routing block for receiving the n multiplexed signals to output an assignment signal for each of effective input cells in the n multiplexed signals, and a concentration buffer block including an n×n banyan network having n input ports, n output ports and a set of switches for switching each of the effective cells supplied to the n input ports to one of the n output ports based on the assignment signal, and an output buffer block including n output buffers each for receiving effective cells through one of the output ports.

The present invention also provides, in another aspect thereof, an ATM switching system comprising:

a plurality of (m) ATM switch modules each having a plurality of (n) inputs each for receiving an input cell sequence, a routing judgement block for judging a destination of input cells in the input cell sequence to deliver a destination signal corresponding to each of the input cells, a selector for selecting n inputs from the inputs of own ATM switch module or the inputs of other ATM switch module, and a n×n ATM switch for receiving outputs from the selector; and a coupling module having m×n input ports connected to the inputs of the m ATM switch modules, m output port groups each including n output ports, the output port group corresponding to the m ATM switch modules, at least one multiplexing block for multiplexing m×n signal sequences received from the plurality of ATM modules into n signal sequences, and m concentration buffer blocks each including a n×n banyan network and an output buffer block for receiving input cells in the n signal sequences from the multiplexing block to output the input cells through one of the output port groups to the selector of one of the ATM witch modules based on the assignment signal.

In accordance with the concentrator type ATM switch and the ATM switching system of the present invention, the rise in the transfer rate of the concentrator type ATM switch (concentrator) is suppressed, which enables a non-blocking switching operation wherein effective cells are not discarded.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings, wherein similar constituent elements are designated by similar reference numerals.

Figure 2:
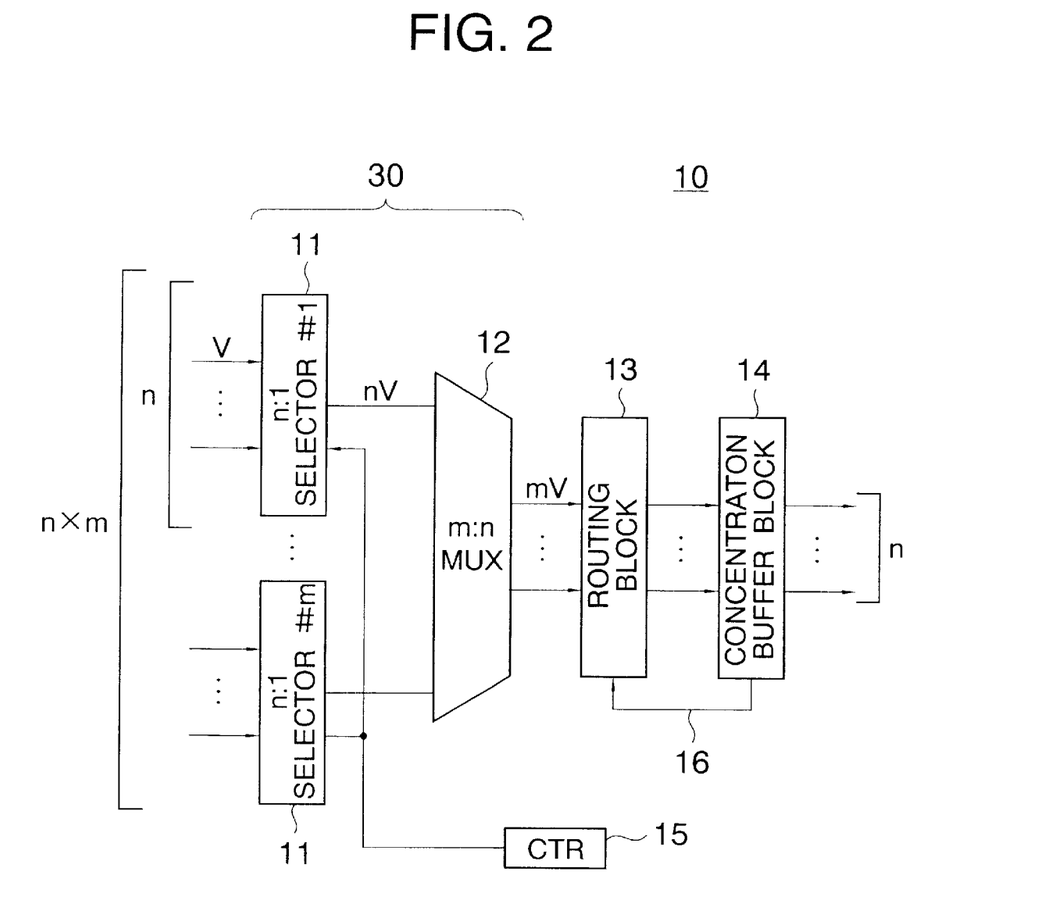
FIG. 2 is a block diagram of a concentrator type ATM switch according to a first embodiment of the present invention.

Referring to FIG. 2, a concentrator type ATM switching system (referred to as a concentrator, hereinafter), generally designated by 10, according to a first embodiment of the present invention can be used in place of a concentrator 26 in the ATM switching system of FIG. 1. The concentrator 10 includes a multiplexing block 30 including a plurality of (m) n-to-1 selectors and a m-to-n multiplexer (MUX) 12, a routing block 13, a concentration buffer block 14, and an output counter 15 consecutively cascaded in the concentrator 10 where m and n are integers and m>n.

Each of the m selectors 11 receives n input signals each delivered at a rate of V to select one of the n input signals. The multiplexer (MUX) 12 receives m input signals each delivered at a rate of nV from m selectors 11 to deliver n multiplexed signal sequences each at a rate of mV. The routing block 13 receives n signal sequences from the multiplexer 12 to output the same after assigning the output buffer ports in the concentration buffer block 14 for the m multiplexed signal sequences. The concentration buffer block 14 delivers n multiplexed signal sequences each at a rate of V. The output counter 15 controls each of m selectors 11.

The concentration buffer block 14 includes a n×n banyan network for switching the n multiplexed signal sequences to n output buffer ports based on the assignment signal specified by the routing block 13. The concentration buffer block 14 delivers a buffer control signal 16 for informing the present state of storage in the output buffers in the concentration buffer block 14 to the routing block 13.

In operation, input cells supplied to each selector 11 at a rate of V are selected one by one, based on the count output of the counter 15, to be multiplexed into a single signal sequence at a rate of nV. Outputs from m selectors 11, which are numbered from #1 to #m, are further multiplexed into n signal sequences at a rate of mV in the m-to-n multiplexer 12 and supplied to the routing block 13. The routing block 13 assigns an output port of the concentration buffer block 14 by its number, through which the concentration buffer block 14 delivers the cells, for each effective cell. The assigned output port numbers do not overlap one another, because the output port numbers are sequentially assigned to the effective cells in the order of the input ports delivering the effective cells. The output port numbers are sequentially assigned basically beginning from the input port #0 without initializing. When an output port number is assigned to the effective cell from the input port #0, the output port number is set at #0 by an initialization on condition that all the output buffers in the concentration buffer block are empty.

The present state of storage in the output buffers in the concentration buffer block 14 is informed to the routing block 13 through a buffer control signal 16. The routing block 13 may be implemented by a plurality of counters, for example. In the concentration buffer block 14, effective cells are delivered by the n×n banyan network through the output ports specified by the output port numbers assigned by the routing block 13.

Now, it is assumed that a large-scale ATM switching system, such as shown in FIG. 1, is implemented by coupling a plurality of (m) small-scale n×n ATM switch modules 21 to one another by a coupling module 25 including m concentrators 10 of the present embodiment instead of the m concentrators 26.

Referring to FIG. 1, wherein the m conventional concentrators 26 are replaced by the m concentrators 10 of the present embodiment, the rout judgement block 24 judges the destination of the input cell and specifies one of the n×n ATM switch modules 21 based on the destination. All the concentrators 10 judge whether or not their own concentrators are connected to the specified n×n ATM switch 21, thereby determining whether the data cell supplied thereto is an effective cell or an invalid cell. Thus, one of the concentrators 10 recognizes the data cell as an effective cell for each input cell. The information of destination may be supplied to the concentrator 10 as an additional data stored in an excess bit not specified before in the data cell or may be supplied through a separate line. If a plurality of concentrators 10 are allowed to judge the input cell as an effective cell instead, a multi-cast processing operation can be obtained.

Figure 3:
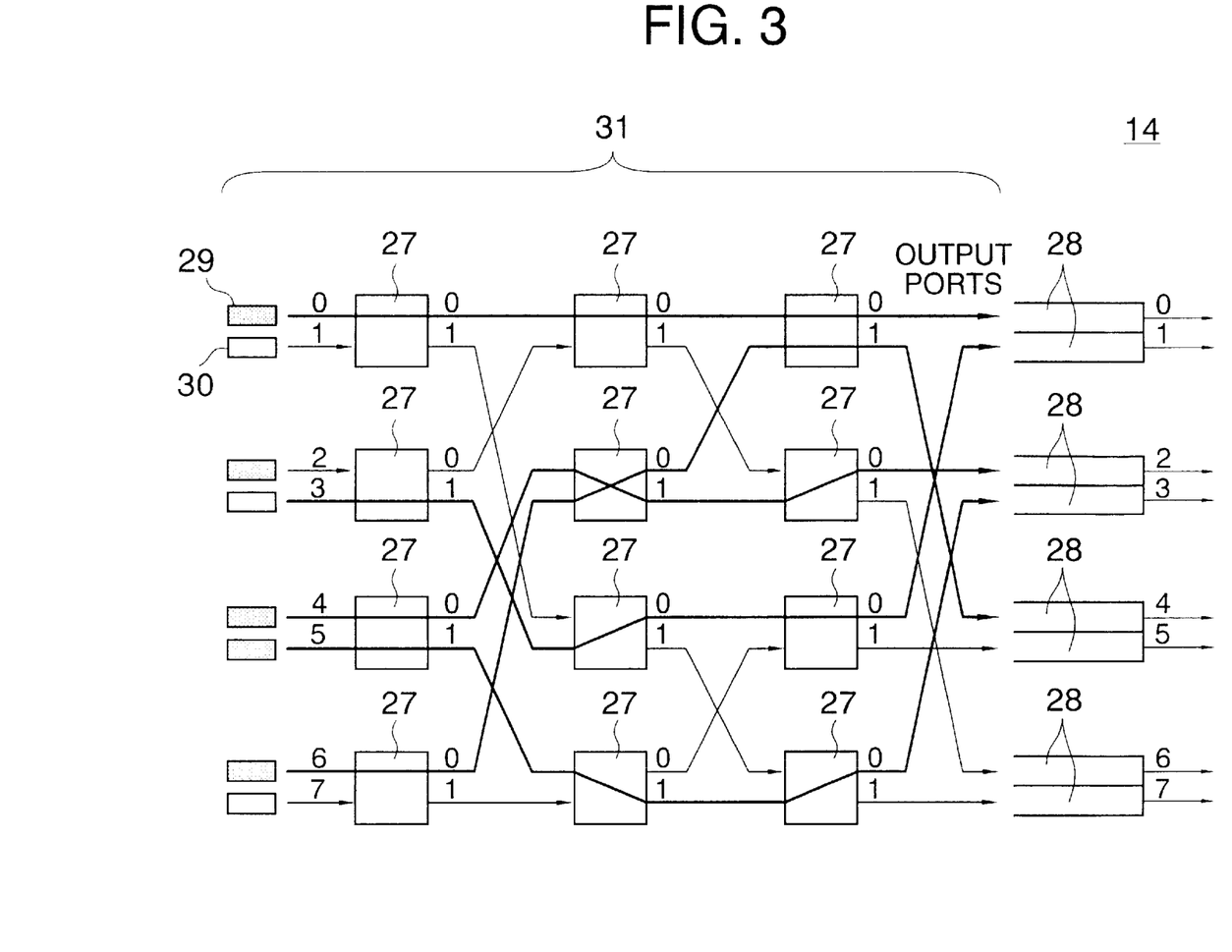
FIG. 3 is a schematic operational diagram of a n×n banyan network in the concentration buffer block shown in FIG. 2.
Figure 4:
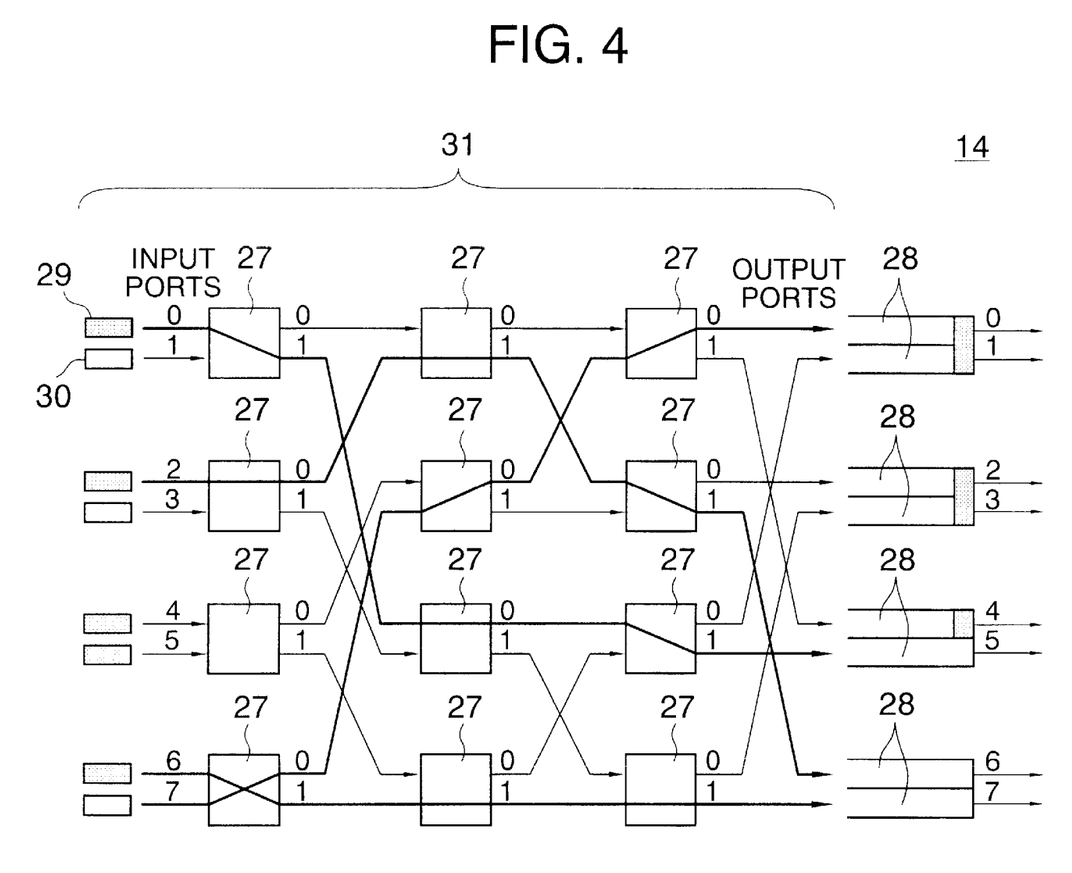
FIG. 4 is a schematic operational diagram of a n×n banyan network in the concentration buffer block shown in FIG. 2 at a step after the step shown in FIG. 3.

Referring to FIGS. 3 and 4, there is shown signal routing for input cells in the n×n banyan network 31 provided in the concentration buffer block 14 shown in FIG. 2, where n=8. In the example shown in FIGS. 3 and 4, eight input ports and eight output ports are provided in the concentration buffer block 14, and output buffers 28 each for storing a specified number of effective cells are provided in number corresponding to the number of the output ports. The banyan network 31 includes twelve 2×2 switches 27 as a whole for coupling eight input ports to eight output ports. Reference numeral 29 represents an effective cell among the input data cells, and reference numeral 30 represents an invalid cell.

In FIGS. 3 and 4, each effective cell 29 has an output port number specified by the routing block 13. When the output port number of an effective cell 29 is 6 (110 in a binary notation), for example, a corresponding first stage switch 27 selects "0" based on the least significant bit (LSB) of the output port number, the second stage switch connected to the selected "0" of the first stage switch 27 then selects "1" based on the intermediate bit of the first effective cell, and the third stage switch 27 connected to the selected "1" of the second stage switch 27 then selects "1" based on the most significant bit (MSB), thereby reaching output port #6 from any of the starting input ports #1 to #6. Even if effective cells are supplied through all the input ports #0 to #6 at the same time, a non-blocking switching operation can be obtained in the banyan network 31 so long as a common output port is not specified in the effective cells by the routing block 13, thereby avoiding a cell discard. Such a configuration is described in "SWITCHING AND TRAFFIC THEORY FOR INTEGRATED BROADBAND NETWORKS" by Joseph Y. Hui Kluwer, Academic Publishers, pp126–135.

In the example of FIG. 3, effective cells 29 are input to the input port #0, #3, #4, #5, and #6 at the same time. At this stage, since all the output buffers 28 corresponding to the output ports #0 to #7 are empty, the effective cells 29 are assigned to output ports #0, #1, #2, #3, and #4, respectively. Each effective cell traces the route, as shown by a thick line, to be stored in the specified output buffer 28.

In FIG. 4 showing a step subsequent to the step shown in FIG. 3, next effective cells 29 are supplied through the input ports #0, #2, #6, and #7 at the same time, after the previous cells are stored in the output ports #0 to #4. In this case, output port numbers following the output port numbers specified by the previous stage is assigned to the effective cells 29, thereby assigning output ports #5, #6, #7 and #0 to the effective cells 29. Each effective cells 29 traces the route, shown by a thick line, to be stored in the specified output buffer 28, similarly to the step of FIG. 3.

Figure 5:
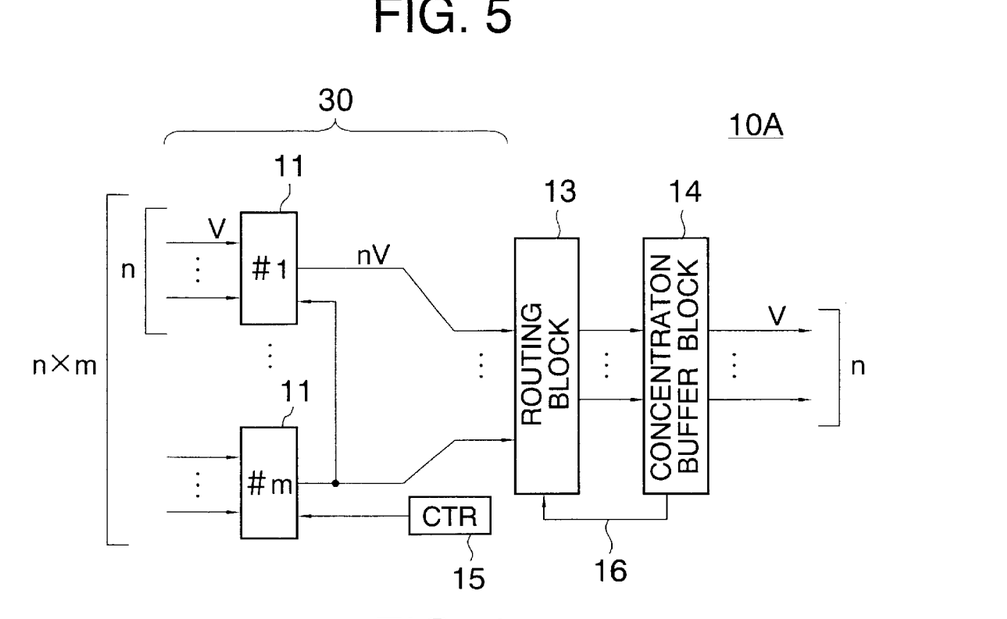
FIG. 5 is a block diagram of a concentrator type ATM switch according to a second embodiment of the present invention.

Referring to FIG. 5, a concentrator 10A according to a second embodiment of the present invention is similar to the first embodiment, except that the m-to-n multiplexer 12 is omitted in the present embodiment. This configuration can be used in the case of m=n or m<n. In this embodiment, the output of each selector 11 is directly supplied to the routing block 13. Assignment of the output ports in the concentration buffer block 14 can be effected similarly to the first embodiment. If m<n, dummy cells in number corresponding to n−m are supplied so that a processing similar to the case of m=n is performed.

Figure 6:
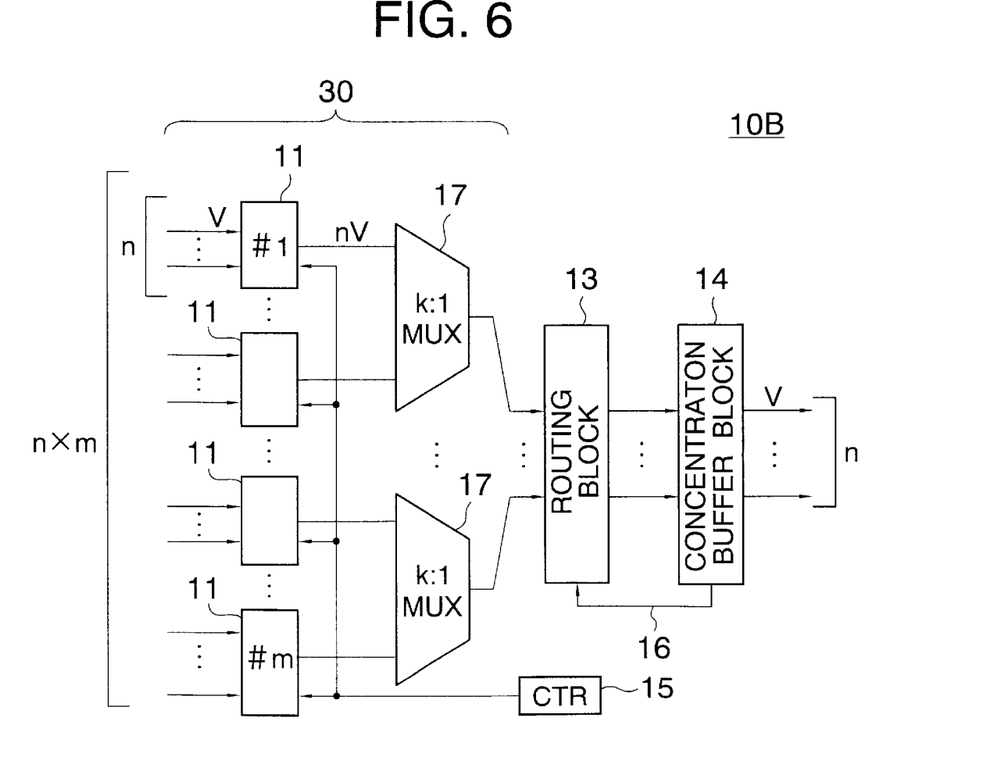
FIG. 6 is a block diagram of a concentrator type ATM switch according to a third embodiment of the present invention.

Referring to FIG. 6, a concentrator 10B according to a third embodiment of the present invention is similar to the first 5 embodiment except that a plurality of k-to-1 multiplexers 17 each for multiplexing k signal sequences into a single signal sequence are provided instead of the m-to-n multiplexer 12. This configuration can be used in the case of m>n. Specifically, m signal lines from the m selectors 11 are divided into m/k groups each including k signal lines (m/k≦n), thereby reducing the signal lines input to the banyan network 31 down to equal to n or less. The first embodiment and the third embodiment can be selected in the case of m>n depending on the conveniences for data conversion.

Figure 7:
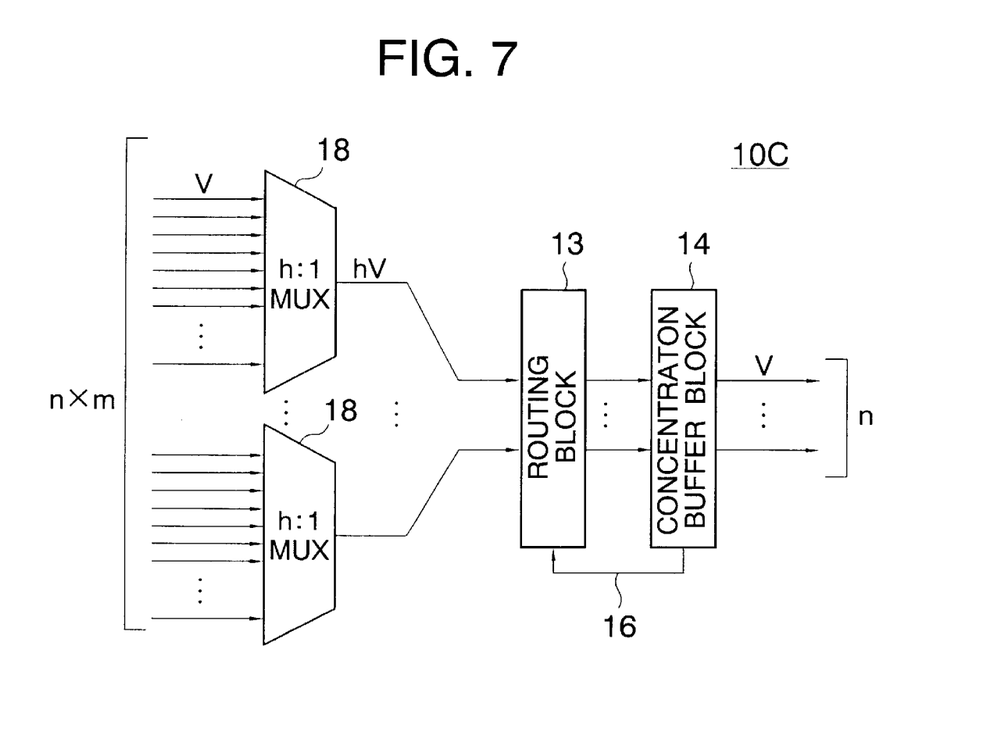
FIG. 7 is a block diagram of a concentrator type ATM switch according to a fourth embodiment of the present invention.

Referring to FIG. 7, a concentrator 10C according to a fourth embodiment of the present invention is similar to the second embodiment except that a plurality of h-to-1 selectors 18 are provided in the present embodiment instead of n-to-1 selectors 11. The number of h-to-1 selectors 18 is determined to be equal to or less than n by selecting a suitable number for h where m≦h. The outputs of the multiplexers 18 can be processed by the routing block 13 and the concentration buffer block 14, similarly to the first embodiment or the second embodiment.

Figure 8:
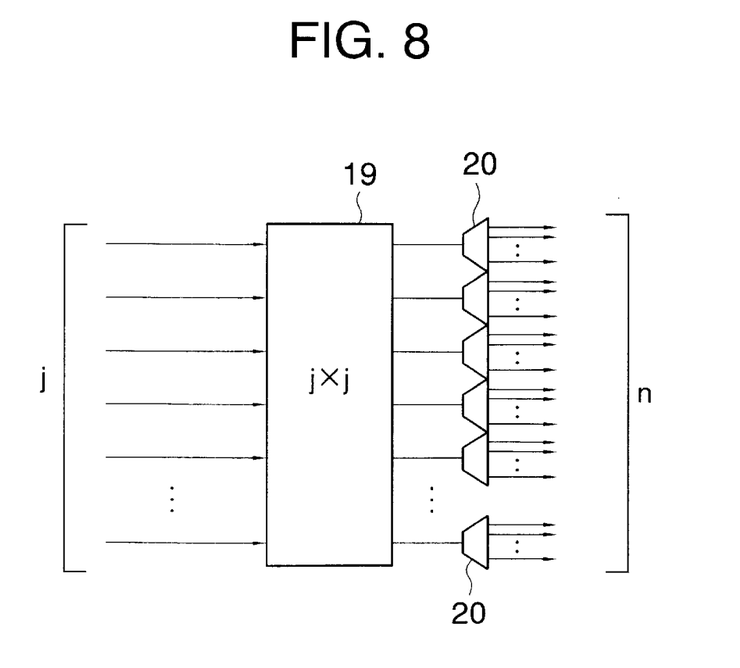
FIG. 8 is a block diagram of a j×n switch as used in place of the banyan network in the embodiments of the present invention.

Referring to FIG. 8, there is shown a j×n switch 14A including a j×j banyan network 19 and a plurality of (j) 1-to-i demultiplexers (DMUX) 20. In FIG. 8, it is assumed that j<n and j×i=n. The j×n switch 14A can be used instead of the n×n banyan network 31 in the concentration buffer block 14 in FIG. 2 and FIGS. 5 to 7. A non-blocking switching operation can be obtained, similarly to the cases shown in FIG. 2 and FIGS. 5 to 7, by multiplexing the m×n input data into j signal sequences, assigning the n output buffers 18 sequentially to the effective cells in the routing block 13, and switching by the j×n switch 14A shown in FIG. 8.

The n×n banyan network 31 has more input/output ports than the j×n switch 14A so that a processing at a lower transfer rate can be obtained in the banyan network 31. However, the j×n switch 14A implemented by the combination of j×j banyan network 19 and the demultiplexers 20 can achieve a comparatively smaller circuit scale of the concentrator.

The multiplexers provided in the above embodiments at the stages preceding the routing blocks 13 in the respective concentrators 10 in FIG. 1 can be combined as a common multiplexer for all the concentrators 10. In this case, the outputs from the common multiplexer are delivered to the routing blocks 13 and the concentration buffer block 14 in the respective concentrators.

Since the above embodiments are described only for examples, the present invention is not limited to the above embodiments and various modifications or alterations can be easily made therefrom by those skilled in the art without departing from the scope of the present invention.

What is claimed is:

1. An ATM switch comprising a multiplexing block for receiving a plurality of (m) signal groups each including a plurality of (n) input signal sequences, said multiplexing block outputting n multiplexed signal sequences, a routing block for receiving said n multiplexed signal sequences to output an assignment signal for each of effective input cells in said n multiplexed signal sequences, and a concentration buffer block including a n×n banyan network having n input ports, n output ports and a set of switches for switching each of said effective cells supplied to said n input ports to one of said n output ports sequentially based on said assignment signal, and an output buffer block including n output buffers each for receiving effective cells through one of said output ports.

2. The ATM switch as defined in claim 1, wherein said multiplexing block comprises m selectors each for consecutively selecting one of said n input signals and a multiplexer for multiplexing outputs from said m selectors into n signal sequences.

3. The ATM switch as defined in claim 2, wherein said m selectors are controlled by a counter.

4. An ATM switch comprising a multiplexing block for receiving a plurality of (m) signal groups each including a plurality of (n) signal sequences, said multiplexing block outputting n multiplexed signal sequences, a routing block for receiving said n multiplexed signal sequences to output an assignment signal for each of effective input cells in said n multiplexed signal sequences, and a concentration buffer block including an n×n banyan network having n input ports, n output ports and a set of switches for switching each of said effective cells supplied to said n input ports to one of said n output ports based on said assignment signal, and an output buffer block including n output buffers each for receiving effective cells through one of said output ports, wherein said multiplexing block comprises m selectors each for consecutively selecting one of said n input signals, m being equal to or less than n.

5. The ATM switch as defined in claim 4, wherein said m selectors are controlled by a counter.

6. An ATM switch comprising a multiplexing block for receiving a plurality of (m) signal groups each including a plurality of (n) output signal sequences, said multiplexing block outputting n multiplexed signal sequences, a routing block for receiving said n multiplexed signal sequences to output an assignment signal for each of effective input cells in said n multiplexed signal sequences, and a concentration buffer block including an n×n banyan network having n input ports, n output ports and a set of switches for switching each of said effective cells supplied to said n input ports to one of said n output ports based on said assignment signal, and an output buffer clock including n output buffers each for receiving effective cells through one of said n output ports, wherein said multiplexing block comprises m selectors each consecutively selecting one of n input signals and a plurality of multiplexers each for multiplexing outputs from k selectors into a single signal sequence, m/k being equal to or less than n.

7. The ATM switch as defined in claim 6, wherein said m selectors are controlled by a counter.

8. An ATM switch comprising a multiplexing block for receiving a plurality of (m) signal groups each including a plurality of (n) input signal sequences, said multiplexing block outputting n multiplexed signal sequences, a routing block for receiving said n multiplexed signal sequences to output an assignment signal for each of effective input cells in said n multiplexed signal sequences, and a concentration buffer block including a n×n banyan network having n input ports, n output ports and a set of switches for switching each of said effective cells supplied to said n input ports to one of said n output ports based on said assignment signal, and an output buffer block including n output buffers each for receiving effective cells through one of said output ports, wherein said multiplexing block comprises a plurality of multiplexers for multiplexing a plurality (h) of m×n input signals, m being equal to or less than h.

9. An ATM switch comprising a multiplexing block for receiving a plurality of (m) signal groups each including a plurality of (n) input signal sequences, said multiplexing block outputting a plurality of (j) multiplexed signal sequences, a routing block for receiving said multiplexed signal sequences to output an assignment signal for each of effective input cells in said multiplexed signal sequences, and a concentration buffer block including a j×j banyan network having j input ports, j output ports and a set of switches for switching each of said effective cells supplied to said j input ports to one of said j output ports based on said assignment signal, j demultiplexers for demultiplexing a single signal sequence into i signal sequences, and an output buffer block including n output buffers each for receiving effective cells through of said output ports, j×i being equal to n.

10. An ATM switching system comprising:
a plurality of (m) ATM switch modules each having a plurality of (n) inputs each for receiving an input cell sequence, a routing judgement block for judging a destination of input cells in said input cell sequence to deliver a destination signal corresponding to each of said input cells, a selector for selecting n inputs from said inputs of own ATM switch module or said inputs of other ATM switch module, and a n×n ATM switch for receiving outputs from said selector; and a coupling module having m×n input ports connected to said inputs of said m ATM switch modules, m output port groups each including n output ports, said output port group corresponding to said m ATM switch modules, at least one multiplexing block for multiplexing m×n signal sequences received from said plurality of ATM modules into n signal sequences, and m concentration buffer blocks each including a n×n banyan network and an output buffer block for receiving input cells in said n signal sequences from said multiplexing block to output said input cells sequentially through one of said output port groups to said selector of one of said ATM switch modules based on said assignment signal.

11. The ATM switching system as defined in claim 10, wherein said combination of n×n banyan network and output buffer block outputs said input cells through another of said output port groups to said selector of another of said ATM switch modules.

12. An ATM switching system comprising:
a plurality of (m) ATM switch modules each having a plurality of (n) inputs each for receiving an input cell sequence, a routing judgement block for judging a destination of input cells in said input cell sequence to deliver a destination signal corresponding to each of said input cells, a selector for selecting n inputs from said inputs of own module or said inputs of other station, and a n×n ATM switch for receiving outputs from said selector; and a coupling module having m×n input ports connected to said inputs of said m ATM switch modules, m output port groups each including n output ports, said output port group corresponding to said m ATM switch modules, at least one multiplexing block for multiplexing m×n signal sequences received from said plurality of ATM modules into j signal sequences, and m concentration buffer blocks each including a j×j banyan network, j 1-to-i multiplexers and an output buffer blocks including n output buffers, each of said concentration buffer blocks receiving input cells in said j signal sequences from said multiplexing block to output said input cells through one of said output port groups to said selector of one of said ATM switch modules based on said assignment, j×i being equal to n.

13. The ATM switching system as defined in claim 12, wherein said concentrator outputs said input cells through another of said output port groups to another of said ATM switch modules.

* * * * *